E. B. TIMMONS.
SEEDER.
APPLICATION FILED FEB. 21, 1921.
1,390,940.
Patented Sept. 13, 1921.
2 SHEETS—SHEET 1.
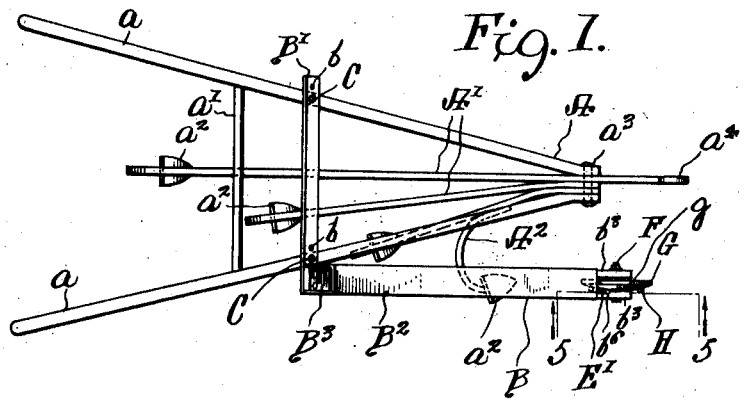
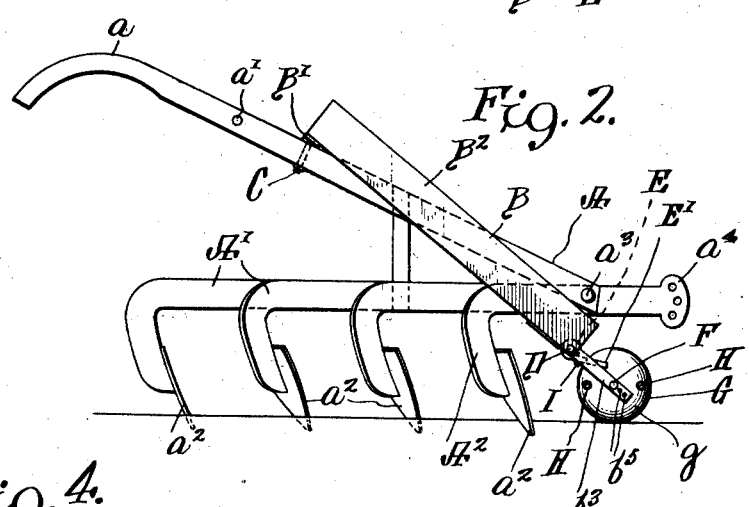
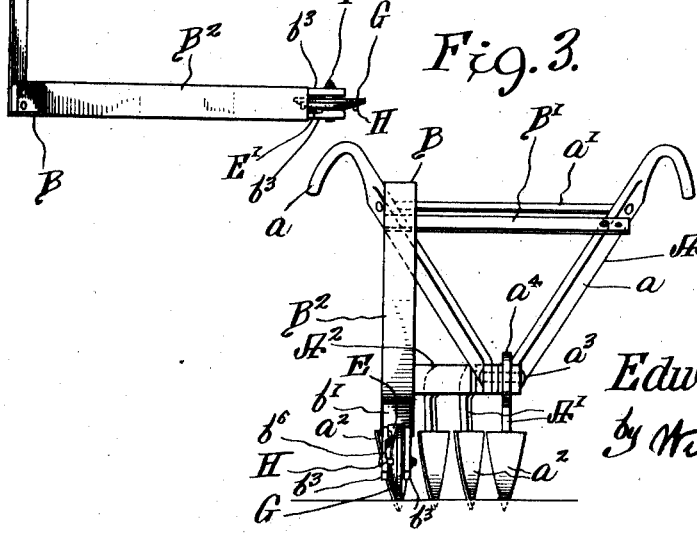
Inventor
Edward B. Timmons
by Wilkinson & Giusta,
Attorneys

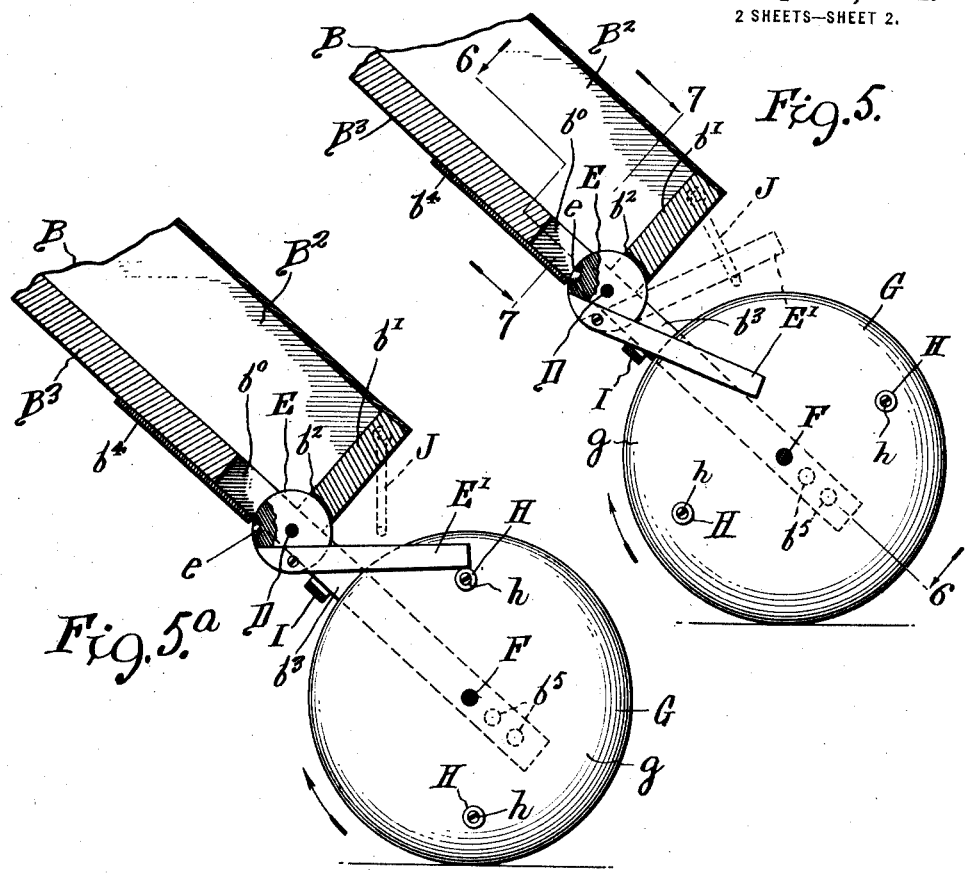
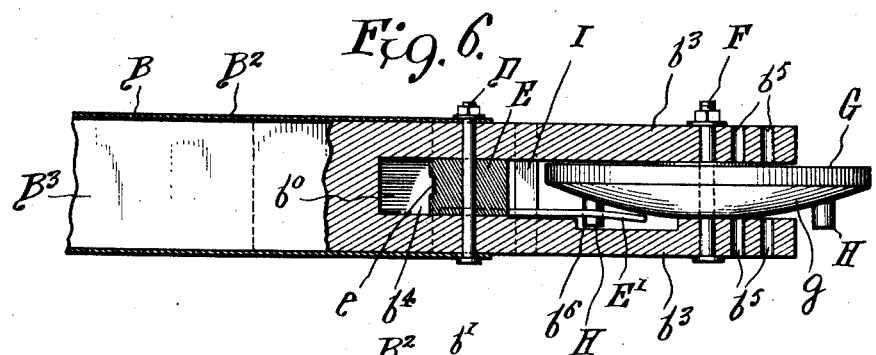

UNITED STATES PATENT OFFICE.

EDWARD BOOTH TIMMONS, OF CHARLOTTE, NORTH CAROLINA.

SEEDER.

1,390,940. Specification of Letters Patent. Patented Sept. 13, 1921.

Application filed February 21, 1921. Serial No. 446,616.

*To all whom it may concern:*

Be it known that I, EDWARD BOOTH TIMMONS, a citizen of the United States, residing at Charlotte, in the county of Mecklenburg and State of North Carolina, have invented certain new and useful Improvements in Seeders; and I do hereby declare the following to be a full, clear, and exact description of the invention, such as will enable others skilled in the art to which it appertains to make and use the same.

My invention relates to improvements in seeder attachments for use with agricultural implements, such as plows, cultivators, harrows, or the like, and it is intended to provide a cheap, simple and efficient implement which may be readily secured to or removed from any of these implements of standard or suitable type, without necessitating any changes in the construction of the implement proper, and without involving any material trouble and expense on behalf of the operator.

While the invention is primarily intended for use in planting peas, soy beans, or the like, it is also adapted for use in planting corn or other seeds where it is desired to space the seeds apart in planting the same so that there may be a suitable distance between the growing plants after the seeds have germinated and the plants have grown.

My invention will be more fully understood after reference to the accompanying drawings, in which like parts are indicated by similar reference symbols throughout the several views, and in which:—

Figure 1 is a plan view of a well known type of cultivator showing my improved seeder attachment connected thereon.

Fig. 2 is a side elevation of the construction shown in Fig. 1.

Fig. 3 is a front elevation of the construction shown in Figs. 1 and 2.

Fig. 4 is a detail view showing the seeder attachment before it is applied to the agricultural implement and before the cross piece is perforated.

Figs. 5 and 5$^a$ show sectional views on a larger scale along the line 5—5 of Fig. 1, and show the feed wheel in the closed and in the operative position.

Fig. 6 shows a section along the line 6—6 of Fig. 5, and looking in the direction of the arrows; and Fig. 7 is a cross section along the line 7—7 of Fig. 5, and looking in the direction of the arrows.

A represents the cultivator which is shown of an old and well known type, and no special claim is made to this device *per se*. This cultivator is shown as provided with the usual handles $a$ and with the cross piece $a'$, and with the beams $A'$ and $A^2$ which carry the cultivator blades $a^2$. These beams are connected at the front end to the handles in any convenient way, as by means of the bolt $a^3$, and one of these beams is provided with a suitable clevis $a^4$. As before stated, no claim is made to the construction of the cultivator, as the one shown is merely typical of a well known agricultural implement to which my improved seeder attachment may be connected.

This seeder attachment B comprises a cross piece B' and a rectangular box $B^2$, preferably secured at right angles to said cross piece B', and inclined downward as shown in Figs. 1 and 2. This cross piece B' is preferably a metal plate which is left imperforate, as shown in Fig. 4, through which bolt holes $b$ may be drilled or punched in any convenient way, so that the attachment may be conveniently fitted to the particular agricultural implement on which it is intended to be used and to which it may be secured as by means of bolts C, see Figs. 1, 2 and 3.

The rectangular box $B^2$ is open at the top end, and the lower end is closed as by the head $b'$, which is cut partly away as at $b^2$ to register with the upper part of the feed wheel E, as shown in Figs. 5 and 5$^a$. The bottom of the box $B^2$ is closed by a board or plate $B^3$, preferably a wooden board, which projects beyond the head $b'$ of the box to provide two arms $b^3$ forming a yoke into which the axle F of the wheel G is secured. The feed wheel E is provided with a feed pocket $e$, which normally registers with the lower portion of the pocket $b^0$ formed near the lower end of the box $B^2$ just above the plate $b^4$ as shown most clearly in Figs. 5 and 5$^a$.

The feed wheel E is mounted on the spindle D, and carries a striker arm E' adapted to be engaged alternately by the studs H carried by the wheel G, which studs may be secured to said wheel in any convenient way, as by means of the screws $h$. This wheel may be made of wood and rounded as at $g$ so as to form a boss to steady the wheel as it rotates about the axle F, but a metal wheel with a suitable hub may be substituted if desired.

The arms $b^3$ may be provided with perforations $b^5$ to adjust the axle F in or out, relative to the position of the lower end of the box $B^2$ and thus to compensate for variations in the height of the implement on which the seeder attachment is used. One of the arms $b^3$ is cut away as at $b^6$ to permit the free passage of the studs H as shown in Fig. 6.

A stop I is provided to limit the downward travel of the striker arm $E'$.

The operation of the device is as follows:

Assuming the attachment to be of the form shown in Fig. 4, with the cross piece $B'$ imperforate, suitable bolt holes are bored or punched in said cross piece and the said cross piece is attached to the agricultural implement as indicated in Figs. 1, 2 and 3. If, however, it be preferred, the bolt holes may be provided in the device when built. After the device has been attached to the proper height on the agricultural implement, the implement is driven with the box empty to the field where it is intended to be used, and the box may be then filled or partly filled with peas, beans, or other seed to be planted. As the implement is driven over the field, the rotation of the wheel G will cause the studs H to intermittently strike the arm $E'$ and the seeds which accumulate in the pocket $e$ are dropped into the ground where they may be covered by the cultivator or plow, or other implement to which the seeder attachment is connected.

By increasing or decreasing the angular distance between the studs, as by using one, two, three or more studs the distance, on the ground, between consecutive droppings of seed may be varied. A similar result may be obtained by increasing or decreasing the diameter of the wheel G.

Should it be desired to keep the feed wheel in the closed position for any reason, or at any time, as when driving the implement along the road, or when turning furrows, any suitable device may be provided for holding the striker arm $E'$ out of engagement with the studs H, as for instance the link J shown in dotted lines in Fig. 5, in which figure the striker arm $E'$ is also shown in the raised position in dotted lines. When in this position the lower end of the seeder box will be closed.

It will be obvious that various modifications might be made in the herein described construction, and in the combination and arrangement of parts which could be used without departing from the spirit of my invention; and I do not mean to limit the invention to such details except as particularly pointed out in the claims.

Having thus described my invention what I claim and desire to secure by Letters Patent of the United States is:—

1. A seeder attachment for use with agricultural implements, comprising a downwardly inclined box and means for securing same to the implement, the said box being open at its upper end and closed at its lower end, said lower end being provided with a vertically disposed slot, a feed wheel normally closing said slot, said wheel being provided with a seed pocket in its periphery, a striker arm carried by said feed wheel, a yoke projecting from the lower end of said box, and an operating wheel journaled in said yoke and adapted to roll along the ground, with a lug carried by said operating wheel adapted to engage said striker arm, and means for limiting the downward travel of said striker arm, substantially as described.

2. A seeder attachment for use with agricultural implements, comprising a cross piece adapted to be secured to the implement, a box attached to said cross piece and downwardly inclined when attached to the implement, the said box being open at its upper end and closed at its lower end, said lower end being provided with a vertically disposed slot, a feed wheel normally closing said slot, said wheel being provided with a seed pocket in its periphery, a striker arm carried by said feed wheel, a yoke projecting from the lower end of said box, and an operating wheel journaled in said yoke and adapted to roll along the ground, with lugs carried by said operating wheel adapted to engage said striker arm, means for locking said feed wheel in the closed position, and means for limiting the downward travel of said striker arm, substantially as described.

EDWARD BOOTH TIMMONS.